UNITED STATES PATENT OFFICE.

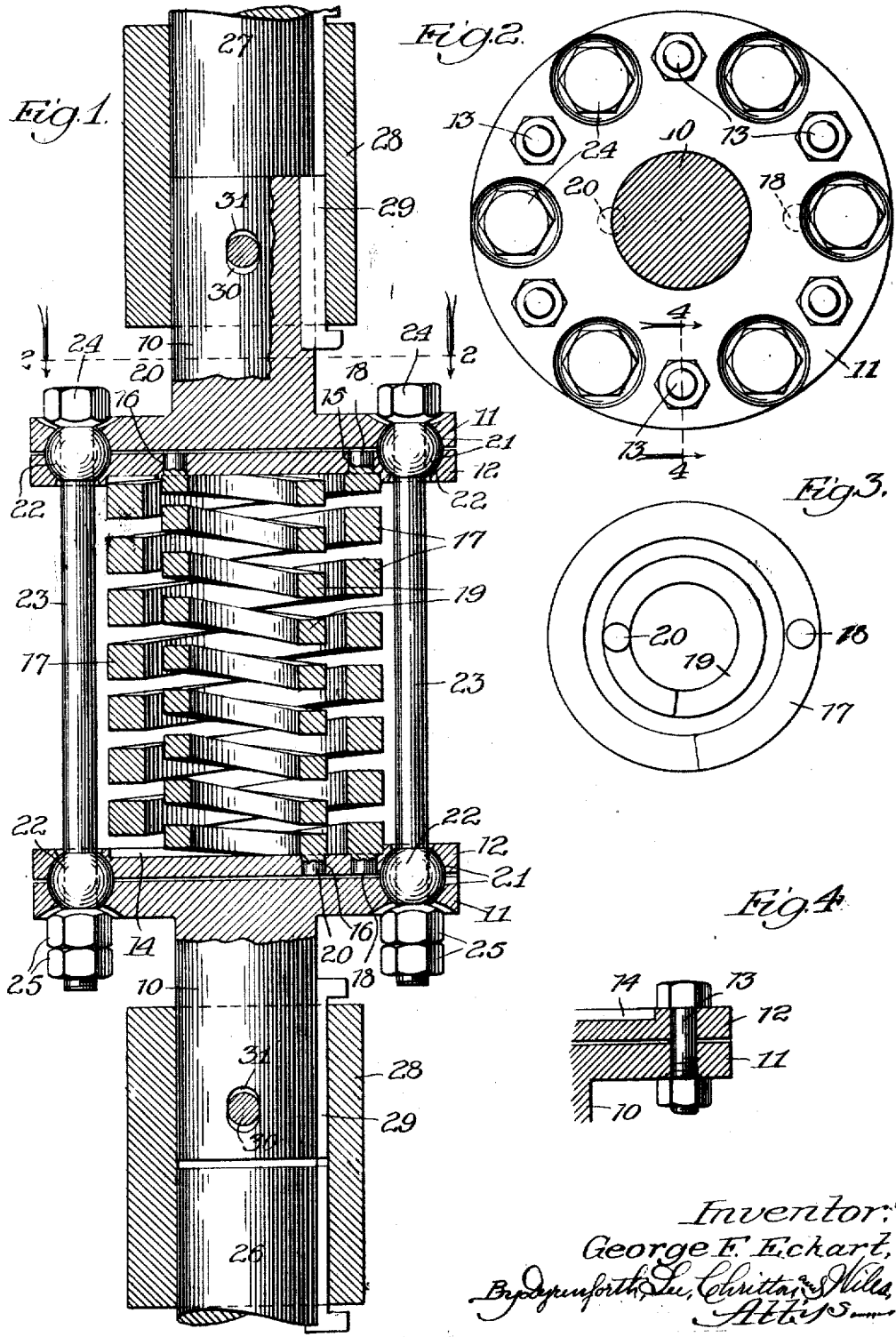

GEORGE F. ECKART, OF LEXINGTON, KENTUCKY.

FLEXIBLE COUPLING.

1,337,646.

Specification of Letters Patent.

Patented Apr. 20, 1920.

Application filed July 24, 1919. Serial No. 312,886.

*To all whom it may concern:*

Be it known that I, GEORGE F. ECKART, a citizen of the United States, residing at Lexington, in the county of Fayette and State of Kentucky, have invented a new and useful Improvement in Flexible Couplings, of which the following is a specification.

My invention relates to flexible couplings and particularly to those adapted to take up certain torsional or endwise strains or shocks as well as bending strains due to misalinements which may be caused either by the shafts being out of parallel or by the shafts being offset.

My invention is fully described and explained in the following specification and shown in the accompanying drawings, in which—

Figure 1 is a longitudinal section of a coupling showing an embodiment of my invention;

Fig. 2 is a partial transverse section on the line 2—2 of Fig. 1:

Fig. 3 is an end view of the concentric driving plate, and

Fig. 4 is a partial section on the line 4—4 of Fig. 2.

I have illustrated my invention in connection with a flexible coupling having a pair of opposing members 10, each having a flange 11, to which are secured plates 12 by any suitable means as bolts 13.

The plates 12 have a countersink 14 and holes 15 and 16. A spring 17 is fitted into this countersink and has pins 18 engaging the holes 15 in the plates 12.

I have preferably arranged another spring 19 within this spring. This spring also carries longitudinally projecting pins 20 which engage the hole 16 in the plates 12. The outer spring is thus held in alinement by means of the countersink 14 and it in turn acts as a guide for the inner spring 19. In assembling, these springs are given an initial twist so as to place them under an initial torsional strain, each spring acting against the other. The flanges 11 and plates 12 are cut out so as to form concentrically arranged pockets 21 in which are placed balls 22. These balls are drilled to receive bolts 23 having heads 24 and lock-nuts 25. The outer edges of the socket are cut back so as to allow free play of these bolts.

It will be understood from the foregoing disclosure that the springs 17 and 19 are always held under compression by the bolts 23. The amount of the compression may be varied by adjustment of the nuts 25.

The members 10 may be connected to the driving-member 26 and the driven member 27 in any suitable manner. I have illustrated them, however, as connected by means of a collar 28, key 29 and pin 30 acting through an elongated slot 31 in the shank of the member 10.

When in operation the plates 12 will turn relatively to each other an amount which will be proportional to the torque, and which will of course depend on the relative strength of the springs. As these plates turn they will cause the bolts to be deflected and turn in the ball and socket joint. This in turn will cause the plates to approach each other slightly owing to the swing of the bolts, which will act as radius arms. This is permitted by the elongated slot 31.

If under any circumstances the members 10 are bent out of alinement, the spring will readily adapt itself to the new condition, and the bolts 23 as they turn to the inside of the bend will loosen. The compression of the spring will then be carried on the outer bolts.

For some purposes I may omit the inner spring entirely and drive through a single spring. For other purposes, however, I find it desirable to use two concentric springs, and in some instances to place these under a mutual torsional strain.

While I have shown but a single embodiment of my invention it is to be understood that it is capable of many modifications. Changes therefore in the construction and arrangement may be made without departing from the spirit and scope of the invention as disclosed in the appended claims.

What I claim as new and desire to secure by Letters Patent is:

1. In a flexible coupling, a pair of opposing members, a pair of springs under a mutual torsional strain secured to said members and additional means flexibly connecting said members for placing said springs under initial compression.

2. In a flexible coupling, a pair of opposing members, a pair of concentrically arranged springs under a mutual torsional strain secured to said members and additional means flexibly connecting said members for placing said springs under initial compression.

3. In a flexible coupling, a pair of opposing members, a pair of springs under a mutual torsional strain secured to said members and flexibly mounted rods connecting said members for placing said springs under initial compression.

4. In a flexible coupling, a pair of opposing members, a spring secured to said members and rods connecting said members and having a ball and socket mounting therein for placing said spring under initial compression.

5. In a flexible coupling, a pair of opposing members, a spring secured to said members and adjustable additional means flexibly connecting said members for placing said spring under initial compression.

6. A flexible coupling, adapted to connect two alined shafts, a pair of opposing members mounted on said shafts, one of said members being splined and adapted to slide on its shaft, a helical spring mounted axially between said members and rods flexibly connecting said opposing members.

7. A flexible coupling, adapted to connect two alined shafts, a pair of opposing members mounted on said shafts, one of said members being splined and adapted to slide on its shaft, a pair of concentric helical springs mounted axially between said members and rods flexibly connecting said opposing members.

8. A flexible coupling, adapted to connect two alined shafts, a pair of opposing members mounted on said shafts one of said members being splined and adapted to slide on its shaft, a helical spring mounted axially between said members, rods flexibly connecting said opposing members, and means for adjusting the pressure on said springs.

9. In a shaft coupling, a pair of opposed members having sockets, a spring between said members, hollow balls rotatable in said sockets and rods passing through said balls and adapted to swing with respect to said members.

10. In a shaft coupling, a pair of opposed members having sockets, a spring between said members, hollow balls rotatable in said sockets, rods passing through said balls and adapted to swing with respect to said members, and means for adjusting the length of said rods.

GEO. F. ECKART.